(12) United States Patent
Malick

(10) Patent No.: US 8,011,502 B2
(45) Date of Patent: Sep. 6, 2011

(54) REUSABLE UNDERWEAR STORAGE CONTAINER BOX

(76) Inventor: Meetra Malick, Turlock, CA (US)

( * ) Notice: Subject to any disclaimer, the term of this patent is extended or adjusted under 35 U.S.C. 154(b) by 256 days.

(21) Appl. No.: 11/941,890

(22) Filed: Nov. 16, 2007

(65) Prior Publication Data

US 2008/0289978 A1 Nov. 27, 2008

Related U.S. Application Data

(60) Provisional application No. 60/939,577, filed on May 22, 2007.

(51) Int. Cl.
*H05B 6/80* (2006.01)

(52) U.S. Cl. .......... 206/278; 206/45; 206/34; 206/515; 206/32; 206/469

(58) Field of Classification Search .......... 206/278, 206/45.34, 515, 45.32
See application file for complete search history.

(56) References Cited

U.S. PATENT DOCUMENTS

| | | | | |
|---|---|---|---|---|
| 870,550 | A * | 11/1907 | Dod | 206/8 |
| 3,190,435 | A * | 6/1965 | Schlanger | 206/278 |
| 3,837,476 | A * | 9/1974 | Schwartz | 206/45.24 |
| D256,727 | S * | 9/1980 | Borg et al. | D24/220 |
| 4,349,102 | A * | 9/1982 | Strongwater | 206/45.24 |
| 4,724,964 | A * | 2/1988 | Hernandez | 206/461 |
| 5,074,410 | A * | 12/1991 | Fries et al. | 206/8 |
| 5,220,999 | A * | 6/1993 | Goulette | 206/470 |
| 5,300,748 | A * | 4/1994 | Colombo | 219/734 |
| 5,320,429 | A * | 6/1994 | Toyosawa | 383/117 |
| D362,802 | S * | 10/1995 | Lee | D9/423 |
| 5,485,919 | A * | 1/1996 | Samberg et al. | 206/461 |
| D402,808 | S * | 12/1998 | Deloach | D3/269 |
| 6,761,291 | B2 * | 7/2004 | Moskovitz et al. | 223/84 |
| 7,163,605 | B2 * | 1/2007 | Chen | 206/292 |
| 7,350,679 | B2 * | 4/2008 | Radtke et al. | 223/84 |
| D600,114 | S * | 9/2009 | Nomura | D9/425 |

* cited by examiner

*Primary Examiner* — Anthony Stashick
*Assistant Examiner* — Cynthia Collado
(74) *Attorney, Agent, or Firm* — Mendelsohn, Drucker & Associates, P.C.; Steve Mendelsohn

(57) ABSTRACT

A reusable stackable storage container for housing, organizing and/or displaying at least one item including a top side casing, a bottom side casing, a first cup-like protrusion formed on the top side casing, a second cup-like protrusion formed on the bottom side casing, and at least one sidewall formed to the bottom side casing, where a cavity between the first cup-like protrusion and the second cup-like protrusion is adapted to receive the at least one item when the container is closed. The container further may comprise a selectively engageable fastening mechanism formed on the top side casing and bottom side casing to open and close the container. A support structure may be formed on a sidewall to provide additional support when the container is standing vertically on the at least one sidewall. Two or more containers can be nestably stacked one into the other, the first cup-like protrusion of one container fitting into the second cup-like protrusion of another container.

38 Claims, 3 Drawing Sheets

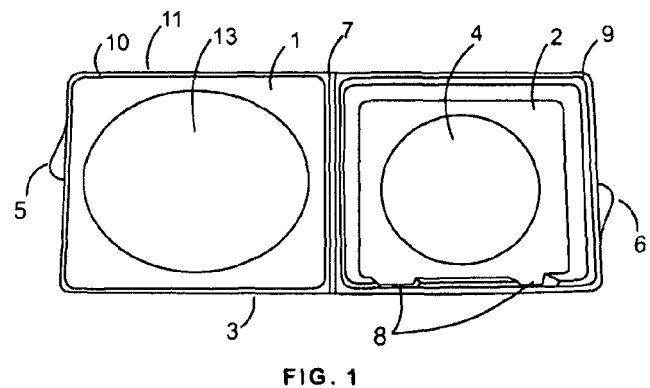
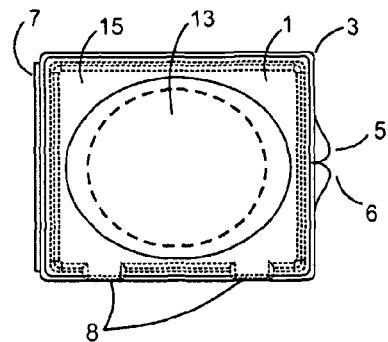
FIG. 1    FIG. 2
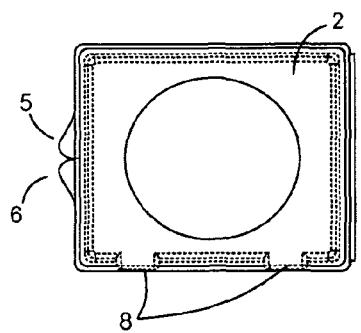
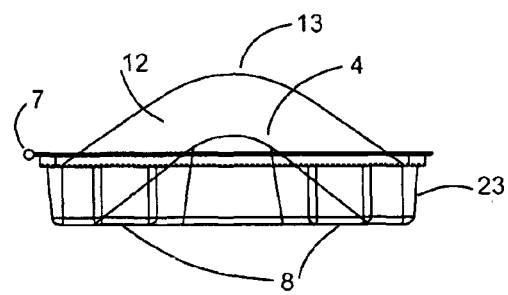
FIG. 3    FIG. 4A
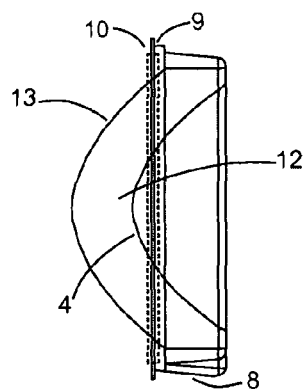
FIG. 4B

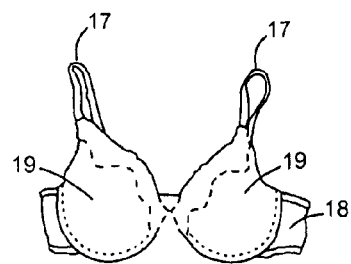
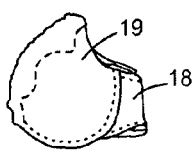
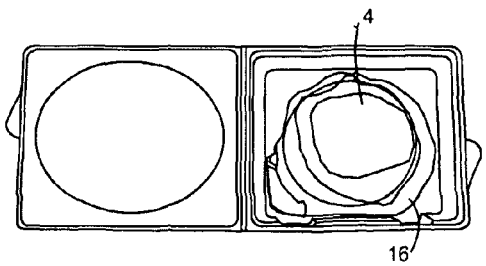
FIG. 5A     FIG. 5B     FIG. 6A
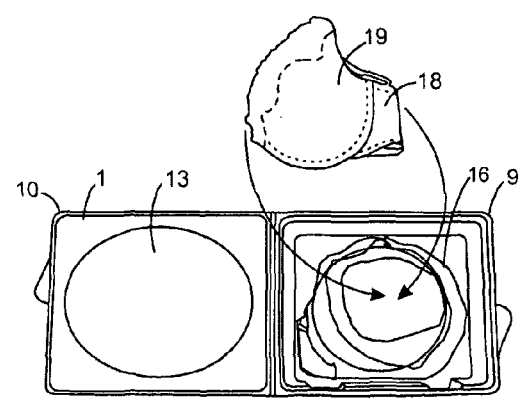
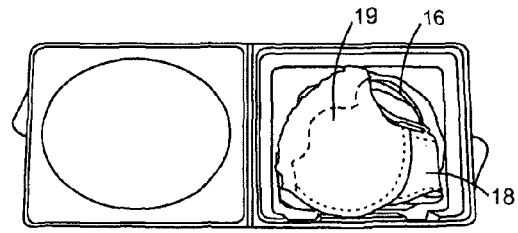
FIG. 6B
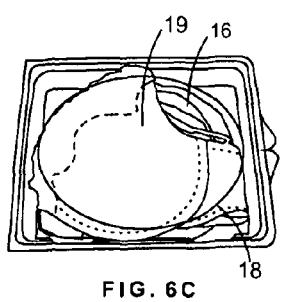
FIG. 6C

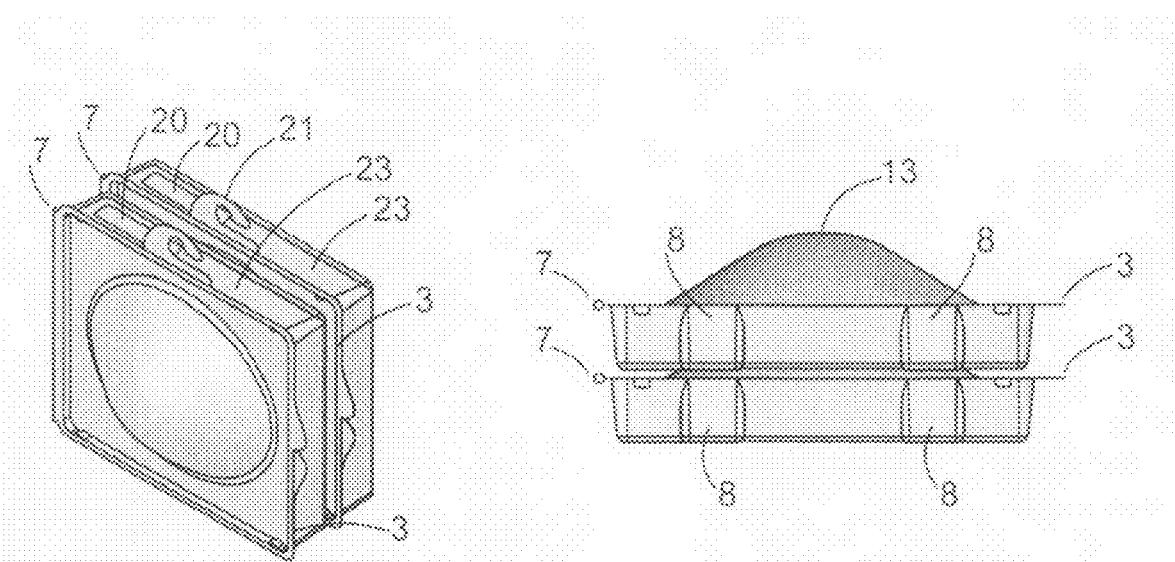
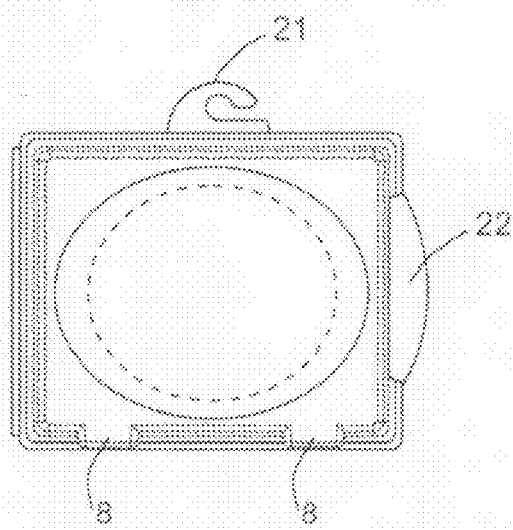

REUSABLE UNDERWEAR STORAGE CONTAINER BOX

CROSS-REFERENCE TO RELATED APPLICATION(S)

This application claims the benefit of U.S. Provisional Application No. 60/939,577 filed on May 22, 2007, which application is incorporated herein by reference.

FIELD OF THE INVENTION

The present invention generally relates to a container for storing and/or displaying products. More specifically this invention relates to a reusable container having a top side casing with a first cup-like or concavo convex protrusion extending therefrom, a bottom side casing with a second cup-like protrusion extending therefrom in generally the same direction as the first cup-like protrusion when the container is closed, and a cavity formed between the first cup-like protrusion and second cup-like protrusion when the container is closed to store or display an article of clothing such as a bra and optionally a panty, a bikini, bra pads, strapless bra, or gel pads. The present invention in certain embodiments is compact, stackable, where two or more containers can be placed one into the other, and thereby stored upright vertically or lay flat horizontally in a nested compact manner. One or more containers may also be vertically stored or displayed on a sidewall without any outside support.

More particularly, this invention relates to a reusable container for storing one or more articles of clothing (bra, bra and panty, bikini, bra pads, strapless bra, or gel pads). This container is constructed in a preferred embodiment of plastic that is transparent/translucent, allowing visualization of the clothing items housed in the box. This same container can be placed in a drawer, on a shelf, on display racks in stores, travel bag, or any other place. The container is a compact storage box that preserves the cup contour of the bra, prevents tangling of bra straps, protects the bra from being crushed and/or soiled, and maximizes space capacity while organizing multiple clothing items in a drawer or any other area.

This same storage container can also be used as a merchandise display package for sale in stores, and/or bra manufacturers can package their bras using this container for sale in either a store or for direct sale to the customer. An attachable hanging means (removable hook, cardboard/plastic insert or any other means) can be added for display purposes and removed for storage by consumer after purchase. A tape with an adhesive side or any other means can be attached to one side of the container sidewall to prevent the bra from being removed in the store. The consumer can remove the tape after purchase and reuse the box for storage.

BACKGROUND OF THE INVENTION

Merchandise display packaging for clothing, such as bras, presently used in stores is typically sealed so that it cannot be opened by customers before purchase. The sealing is such that the packaging must normally be damaged or significantly degraded to open the container. It is intended for single use, not for reusable storage. Thus, customers are typically not able to use such packaging as a storage container for the goods after purchase. Moreover, such packaging is normally designed to be nestable or for stand alone display, but not both.

In designing a container for both store display and consumer storage, one must take into account both the functional and aesthetic aspects of the container. The container must adequately protect the garment without detracting from the garment's appearance. In particular, bra storage containers are particularly difficult to design because of the unique shape of a bra's cup. Bra containers must configure to the bra's cup shape to preserve the garment's structural integrity. Many previous containers take the bra's shape into account but are bulky and have functional limitations. These designs are not versatile and limit product storage or display options. Accordingly, a need exists for an improved storage container for clothing items such as bras and panty, a bikini, strapless bras, or bra gel pads, a container that might also be used for compact retail display as well as consumer storage after purchase.

SUMMARY OF THE INVENTION

The storage container for items of clothing in one embodiment of the present invention comprises a top side casing having a first cup-like protrusion and a bottom side casing having a second cup-like protrusion. The protrusions face such that when the container is closed they extend in the same direction and adjacent containers may be placed at least partially one into the other. At least one sidewall is formed to the bottom side casing and makes a juncture to the top side casing, where this juncture is bendable and functions like a hinge. It may also serve as a support surface upon which the container can rest freestanding. In a preferred embodiment, four sidewalls are formed to the bottom side casing. In other preferred embodiments, one or more sidewalls can be formed. When the container is folded closed, a cavity is formed leaving space for items of clothing to be stored or displayed. A selectively engageable fastening mechanism can seal the top side casing and bottom side casing closed. Preferably, the stackable or nestable storage container is made of a transparent or translucent plastic, such as polyvinylchloride. However, the container may be made of an opaque material, a tinted translucent material, a colored material or even a velvet plastic. Other suitable materials that are durable and appropriate for packaging may also be used. For both cost and environmental reasons, regrind or recycled plastic may also be used.

The fastening mechanism for closing the container can be a compression fit, a snap fit, a frictional fit apparatus or any other appropriate mechanism to engage the top side casing with the sidewalls formed to the bottom side casing. In one particular embodiment, finger tabs or finger holds formed to the top side casing and a sidewall enable a person to easily engage or disengage the fastening mechanism to open or close the container. Other fastening methods and structures are possible as well.

The contour of the cup-like protrusions are designed so that they can generally fit one into the other, enabling two or more containers to fit within or be stacked one on top of the other. In a preferred embodiment, the first cup-like protrusion is larger in volume than the second cup-like protrusion. In other preferred embodiments, the first cup-like protrusion can be the same or smaller in volume than the second cup-like protrusion. In one embodiment, the first cup-like protrusion extends from the flat peripheral surface of the top side casing along an elliptical line while the second cup-like protrusion extends from the flat peripheral surface of the bottom side casing along a circular or slightly elliptical line. Of course, other configurations or combinations of configurations can also be used to similar effect.

The sidewall may be designed so that when the container is closed, the container can be displayed freestanding on a sidewall in an upright position. In one particular embodiment, a support structure is formed to one or more sidewalls to increase the stability of the container when resting on a sidewall. When two or more containers are placed one into the other or stacked one on top of the other, the two or more containers can be displayed on the sidewalls while still placed or stacked together.

In another particular embodiment, a hanging means is attached to the container. In this particular embodiment, the hanging means may comprise a hook. In other preferred embodiments, a T-shaped or triangular aperture, loop shaped device or other suitable device for hanging the container can be used. The hanging means can be permanently attached to the container or can be fixed via a removable attachment means. The removable attachment means can be tape, glue or a weakened portion made to easily cut off the hanger after purchase.

In another preferred embodiment, an identification label is placed on or formed to a sidewall.

These and other objects, advantages and features of the invention will become more readily apparent to those of ordinary skill in the art upon review of the following detailed description of the preferred embodiments, taken in conjunction with the accompanying drawings.

BRIEF DESCRIPTION OF THE DRAWINGS

FIG. 1 is a top or front view of a container when opened in accordance with one embodiment of the invention;

FIG. 2 is a top or front view of the container from outside the top side casing when the container is closed;

FIG. 3 is a bottom or back view of the container from outside the bottom side casing when the container is closed;

FIG. 4A is a side view of the container when resting horizontally from outside a sidewall;

FIG. 4B is a side view of the container when standing vertically on feet on a sidewall;

FIG. 5A is a front view of a bra with straps;

FIG. 5B is a front view of a folded bra for storage in the container;

FIG. 6A is a top or front view of the container when opened with a panty placed around a cup-like protrusion, on the bottom side casing;

FIG. 6B is a pair of top or front views of the container when opened showing placement of a folded bra with a panty placed inside;

FIG. 6C is a top or front view of a closed container containing a bra and panty;

FIG. 7A is a perspective view of two containers stacked vertically nested one into the other resting on feet on a sidewall;

FIG. 7B is a side view of two containers stacked one on top of the other resting on the bottom side casing and showing the feet; and FIG. 8 is a top or front view of a container for store display with a hanging means, and a removable tape to prevent opening of the container before purchase.

DETAILED DESCRIPTION OF THE INVENTION

A first embodiment of the invention is illustrated in FIGS. 1-4. In this embodiment, a stackable storage container 3 includes a square top side casing 1, a square bottom side casing 2, four deep sidewalls 23 formed to the peripheral edges of the bottom side casing 2, a first concavo convex or cup-like protrusion 13 formed in the center of the top side casing 1, and a second concavo convex or cup-like protrusion 4 formed in the center of the bottom side casing 2. The top side casing 1 is formed with a shallow peripheral lip 11, and a juncture 7 extending between one of the deep sidewalls and one edge of the shallow peripheral lip is bendable. A selectively engageable fastening structure 9, 10 is provided between the bottom side casing deep sidewall and the top side casing edge of the shallow peripheral lip, and consists of a compression fit, snap fit, or frictional fit mechanism. While the embodiment shown has a bendable juncture along one edge and snap fit mechanisms along the other edges, it should be understood that the casing halves do not need to be joined together as at the juncture. That is, the casing halves could be connected to one another solely through snap fit or other types of disconnectable mechanisms.

Preferably, the stackable storage container comprises a transparent or translucent plastic, such as polyvinylchloride. The plastic may also be made in whole or in part of recycled plastic to enhance marketing of the container as an environmentally friendly product. However, the container may be made of an opaque material, a tinted translucent material, a colored material or even a velvet plastic. Other suitable materials that are durable and appropriate for packaging may also be used. In one embodiment, finger tabs 5, 6 are attached to the top side casing 1, and the bottom side casing 2 for opening and closing the stackable storage container. A support structure such as feet 8 may be formed on one of the bottom side casing deep sidewalls 23 to buttress the stackable storage container 3 when displayed or stored freestanding on that sidewall 23.

As shown in FIG. 2, the top side casing 1 can be folded on top of the bottom side casing 2 and remain in a closed orientation when the fastening structure 9, 10 is engaged. The first cup-like protrusion 13 formed on the top side casing 1 is larger in volume than the second cup-like protrusion 4 formed on the bottom side casing. This is accomplished in part by configuring the first cup-like protrusion so that it has a larger effective diameter than that of the second cup-like protrusion and by having it intersect the casing along an elliptical line as opposed to the circular line of the second cup-like protrusion. As best illustrated in FIG. 4A, when the container is selectively sealed together, a cavity or space 12 is formed between the first cup-like protrusion 13 and the second cup-like protrusion 4. As illustrated in FIGS. 5A and 5B, a bra or bikini top 18 with cups 19 and straps 17, may be folded so that it can then be placed into the container and fit within the cavity when the container is closed. In this way, the bra or bikini may be stored by a consumer or displayed for retail sale. The space may be designed to be such that it will accommodate bras of various sizes.

As shown in FIGS. 6A-C, in another preferred embodiment, a folded pair of panties 16 fits into the second cup-like protrusion 4. As shown in FIG. 6B a bra 18 with one cup 19 folded on top of the other may also then be placed in the second cup-like protrusion 4 over the panties. As illustrated in FIG. 6C, the cavity 12 is large enough in volume to accommodate both the folded bra 18 and panties 16 when the stackable storage container 3 is closed.

As shown in FIG. 7A, in another preferred embodiment an identification label 20 can be placed or is formed on a sidewall 23. The label can be used by consumers to indicate the contents of the container. Because it is on a sidewall, a consumer can read the label and select an item from one container amongst many in a drawer or other location even though the containers are stored compactly one into the other, side by side. It may also include a bar code for use by a retailer for inventory control. It may further include an RFID tag for tracking or theft prevention. Moreover, because the container is reusable and provides the added value to the customer of a reusable storage container, the label can contain useful information for the customer for long term use of the product such as size and washing instructions.

As illustrated in FIG. 7B, two closed stackable storage containers 3, are stacked nested one on top of the other. The first cup-like protrusion 13 formed on the top side casing 1 fits inside the second cup-like protrusion 4 formed on another stackable storage container's 3 bottom side casing 2. Only two containers are shown for purposes of illustration. It should be understood that additional containers may be added to the nested stack. The containers can be displayed or stored stacked together while resting on one stackable container's 3, bottom side casing 2. As further shown in FIG. 7A, the two closed stackable storage containers 3, can be displayed or stored in a nested stacked position while standing upright on feet 8 on a sidewall 23 without any outside support. Two or more stackable storage containers 3 can be stacked one into the other for storage and/or display. This feature minimizes storage or display space for the consumer or retailer.

As shown in FIG. 8, in another preferred embodiment, a hanging means 21 may be provided for store display on a clothes rack, in a closet, or any other place. The hanging means may be a hook as shown or it could be "T" shaped or triangular aperture, a loop or any other appropriate shape for suspending the container. It is preferred that the hanging means be configured, if possible, for use in a store and also afterwards for consumer storage.

FIG. 8 also shows, in one embodiment, a removable seal in the form of a removable protective tape 22 placed along one side of the container opposite the hinge. A removable seal may be placed on the container to keep it closed and free from tampering during retail display before purchasing. For example, a tamper tape may be placed over finger tabs 5 and 6. Alternatively or in addition to that a heat-shrinkable plastic wrap may be placed around at least the edges of the container to hold the casings together. A perforation or weakened portion may be included in this plastic wrap to make it easier to remove after purchase. A frangible or cuttable piece may also be included that extends between the casing edges opposite the hinge to keep the containers closed until after purchase.

While the present invention has been illustrated by a description of the preferred embodiments and while these embodiments have been described in some detail, it is not the intention of the Applicant to restrict or in any way limit the scope of the appended claims to such detail. Additional advantages and modifications will readily appear to those skilled in the art. This has been a description of the present invention, along with the preferred methods of practicing the present invention as currently known. Various aspects of this invention may be used alone or in different combinations.

What is claimed is:

1. A reusable storage container for at least one item, the container comprising:
    a first cup-like protrusion facing in a first direction and having an oval cross-section in a plane orthogonal to the direction in which the first cup-like protrusion faces;
    a second cup-like protrusion facing in a second direction and having a circular cross-section in a plane orthogonal to the direction in which the second cup-like protrusion faces;
    a cavity between the first cup-like protrusion and second cup-like protrusion adapted to receive the at least one item when the container is closed; and
    at least one sidewall connecting the first cup-like protrusion and second cup-like protrusion,
    wherein the first cup-like protrusion and the second cup-like protrusion face generally in the same direction when the container is closed and are configured such that the container would be nestable with another such container.

2. The reusable storage container of claim 1, further comprising a top side casing and bottom side casing.

3. The reusable storage container of claim 2, wherein the first cup-like protrusion is formed on the top side casing and the second cup-like protrusion is formed on the bottom side casing.

4. The reusable storage container of claim 3, wherein the at least one sidewall is formed in the bottom side casing and the top side casing is formed to the at least one sidewall to form a bendable hinge.

5. The reusable storage container of claim 1, wherein there are four sidewalls.

6. The reusable storage container of claim 1, further comprising a selectively engageable fastening structure to seal the container closed.

7. The reusable storage container of claim 6, wherein the fastening structure is selected from the group consisting of a snap fit, compression fit, or frictional fit device.

8. The reusable storage container of claim 1, wherein the container can rest freestanding on the at least one sidewall.

9. The reusable storage container of claim 8, wherein when two or more containers are stacked one into the other, the two or more containers can be freestanding while standing upright on a sidewall.

10. The reusable storage container of claim 8, further comprising a support structure formed on a sidewall buttressing the container when freestanding upright on a sidewall.

11. The reusable storage container of claim 1, further comprising an opening means selected from the group consisting of finger tabs or a finger hold.

12. The reusable storage container of claim 1, further comprising a hanging means.

13. The reusable storage container of claim 12, wherein the hanging means is selected from the group consisting of a hook device, T-shaped aperture, triangular aperture, or loop device.

14. The reusable storage container of claim 12, wherein the hanging means is permanently attached.

15. The reusable storage container of claim 13, wherein the hanging means is attached via a removable attachment means.

16. The reusable storage container of claim 1, further comprising an identification label on the at least one sidewall.

17. The reusable storage container of claim 1, wherein the storage container is formed of a material selected from the group consisting of a transparent plastic or a translucent plastic.

18. The reusable storage container of claim 1, wherein the at least one item is an article of clothing selected from the group consisting of a bra, panty, bikini, strapless bra, gel cups, or combinations thereof.

19. A storage container for at least one item, the container comprising:
    a top side casing comprising (i) a first curved cup-like protrusion extending in a first direction when the container is closed and (ii) a first flat peripheral surface surrounding the first curved cup-like protrusion; and
    a bottom side casing comprising (i) a second curved cup-like protrusion extending in the first direction when the container is closed and (ii) a second flat peripheral surface surrounding the first curved cup-like protrusion;
    a plurality of sidewalls coupled to the bottom side casing, wherein the top side casing, the bottom side casing, and the plurality of side walls define a cavity adapted to contain the at least one item when the container is closed, wherein the cavity comprises:
a first volumetric space between the first and second curved cup-like protrusions of the top and bottom side casings; and
a second, annular volumetric space between the first and second flat peripheral surfaces of the top and bottom side casings and surrounding the first volumetric space.

20. The storage container of claim 19 wherein the container is reusable.

21. The storage container of claim 19, wherein the container would be nestable with another such container.

22. The storage container of claim 19, wherein the storage container is formed of a material selected from the group consisting of a transparent plastic or a translucent plastic.

23. The storage container of claim 19, wherein the plurality of sidewalls comprises four sidewalls, and wherein a first sidewall comprises a bendable hinge.

24. The storage container of claim 23, wherein a second sidewall opposite the first sidewall comprises a fastening and opening means.

25. A reusable storage container for at least one article of clothing, the container comprising:
a first cup-like protrusion having a first opening and a first volume;
a second cup-like protrusion having a second opening and a second volume, wherein the first and second cup-like protrusions define a cavity adapted to receive the at least one article of clothing when the container is closed;
at least one flat sidewall having a depth oriented in a first direction and connecting the first cup-like protrusion and second cup-like protrusion, and
a plurality of feet extending along the entire depth of the at least one flat side wall, wherein, when the container is closed and empty, the container can rest freestanding on a flat horizontal surface with the plurality of feet in flush contact with the flat horizontal surface and the first cup-like protrusion and the second cup-like protrusion face generally in the same direction and are configured such that the container would be nestable with another such container.

26. The storage container of claim 19, wherein the second cup-like protrusion is smaller than the first cup-like protrusion.

27. The storage container of claim 19, wherein the first and second cup-like protrusions are formed to contain a folded bra between the first and second cup-like protrusions when the container is closed.

28. The storage container of claim 19, wherein the first cup-like protrusion has an oval cross-section, and wherein the second cup-like protrusion has a circular cross-section.

29. The storage container of claim 19, further comprising a plurality of feet, wherein the container can rest freestanding on the plurality of feet.

30. The storage container of claim 29, wherein the container is nestable with another such container when the containers are positioned adjacent one another and resting freestanding on the plurality of feet.

31. The storage container of claim 19, wherein the container is nestable with another such container where the containers are stacked one on top of the other.

32. The storage container of claim 19, wherein a cross-section through the first cup-like protrusion would not have a straight line, and wherein a cross-section through the second cup-like protrusion would not have a straight line.

33. The storage container of claim 19, wherein:
the first opening of the first cup-like protrusion has an oval shape; and
the second opening of the second cup-like protrusion has an oval shape.

34. The reusable storage container of claim 25, wherein:
the first opening of the first cup-like protrusion has an oval shape; and
the second opening of the second cup-like protrusion has an oval shape.

35. The reusable storage container of claim 25, further comprising:
a first flat peripheral surface surrounding the first cup-like protrusion; and
a second flat peripheral surface surrounding the second cup-like protrusion, wherein the cavity comprises:
a first volumetric space between the first and second curved cup-like protrusions; and
a second, annular volumetric space between the first and second flat peripheral surfaces and surrounding the first volumetric space.

36. The reusable storage container of claim 35, wherein:
the first opening of the first cup-like protrusion has an oval shape; and
the second opening of the second cup-like protrusion has an oval shape.

37. A reusable storage container for at least one item, the container comprising:
a first cup-like protrusion facing in a first direction and having an oval cross-section in a plane orthogonal to the direction in which the first cup-like protrusion faces;
a second cup-like protrusion facing in a second direction and having an oval cross-section in a plane orthogonal to the direction in which the second cup-like protrusion faces, wherein the first and second cup-like protrusions define a cavity adapted to receive the at least one item when the container is closed; and
at least one sidewall connecting the first cup-like protrusion and second cup-like protrusion,
wherein the first cup-like protrusion and the second cup-like protrusion face generally in the same direction when the container is closed and are configured such that the container would be nestable with another such container.

38. The reusable storage container of claim 37, wherein the first cup-like protrusion is larger in volume than the second cup-like protrusion.

* * * * *

UNITED STATES PATENT AND TRADEMARK OFFICE
CERTIFICATE OF CORRECTION

| | | |
|---|---|---|
| PATENT NO. | : 8,011,502 B2 | Page 1 of 1 |
| APPLICATION NO. | : 11/941890 | |
| DATED | : September 6, 2011 | |
| INVENTOR(S) | : Meetra Malick | |

It is certified that error appears in the above-identified patent and that said Letters Patent is hereby corrected as shown below:

On the Title Page, insert

Item -- (73) Assignee: New Ideas West, LLC, Turlock, CA (US) --

Signed and Sealed this
Fourth Day of October, 2011

David J. Kappos
*Director of the United States Patent and Trademark Office*